US007945155B2

United States Patent
Jang et al.

(10) Patent No.: US 7,945,155 B2
(45) Date of Patent: May 17, 2011

(54) APPARATUS FOR CAPTURING IMAGES, METHOD OF CONTROLLING EXPOSURE IN THE APPARATUS, AND COMPUTER READABLE RECORDING MEDIUM STORING PROGRAM

(75) Inventors: Soon-geun Jang, Changwon (KR);
Jin-pyo Gwak, Changwon (KR);
Eun-sun Ahn, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 12/380,433

(22) Filed: Feb. 27, 2009

(65) Prior Publication Data
US 2009/0226160 A1 Sep. 10, 2009

(30) Foreign Application Priority Data

Mar. 6, 2008 (KR) .................. 10-2008-0021154

(51) Int. Cl.
*G03B 7/00* (2006.01)
*H04N 5/235* (2006.01)
(52) U.S. Cl. ................................ 396/213; 348/229.1
(58) Field of Classification Search .............. 396/96, 396/213, 242, 243, 246; 348/229.1, 362
See application file for complete search history.

(56) References Cited

U.S. PATENT DOCUMENTS 5,532,785 A * 7/1996 Goto et al. ............. 396/246
7,684,690 B2 * 3/2010 Lee ........................ 396/213

* cited by examiner

*Primary Examiner* — W. B. Perkey
*Assistant Examiner* — Minh Q Phan
(74) *Attorney, Agent, or Firm* — Drinker Biddle & Reath LLP

(57) ABSTRACT

A method of controlling exposure under low brightness conditions, comprising calculating an automatic exposure time such that an exposure time is substantially in inverse proportion to the brightness of a subject; when the automatic exposure time is smaller than a first exposure time value, setting a control exposure time as the automatic exposure time; when the automatic exposure time is greater than or equal to the first exposure time and smaller than or equal to a second exposure time, setting the control exposure time as the first exposure time; when the automatic exposure time is greater than the second exposure time, setting the control exposure time to be substantially in proportion to the automatic exposure time such that the control exposure time is smaller than the automatic exposure time by predetermined steps; and increasing sensitivity according to a difference between the automatic exposure time and the control exposure time.

16 Claims, 5 Drawing Sheets

APPARATUS FOR CAPTURING IMAGES, METHOD OF CONTROLLING EXPOSURE IN THE APPARATUS, AND COMPUTER READABLE RECORDING MEDIUM STORING PROGRAM

CROSS-REFERENCE TO RELATED PATENT APPLICATION

This application claims the benefit of Korean Patent Application No. 10-2008-0021154, filed on Mar. 6, 2008 in the Korean Intellectual Property Office, the disclosure of which is incorporated herein in its entirety by reference.

BACKGROUND

1. Field of the Invention

The present invention relates to an apparatus for capturing images, a method of controlling the exposure in the apparatus, a method of capturing images, and a computer readable medium storing a program for the method of capturing images, and more particularly, to an apparatus for capturing images, a method of controlling the exposure in the apparatus, a method of capturing images, and a computer readable medium storing a program for the images capturing method in which hand shake blur and noise, which are caused due to a relatively long exposure time in a high brightness when capturing an image in a dark environment like at night or indoors, are reduced.

2. Description of the Related Art

Examples of methods of reducing hand shake blur are an optical hand-shake correction method and an electronic hand-shake correction method. The optical hand-shake correction method moves the position of a lens with respect to an image sensor or the position of the image sensor with respect to the lens in the opposite direction to a hand shake direction. The electronic hand shake correction method forms an image with little hand shake blur using an exposure control algorithm.

Meanwhile, an apparatus for capturing images provides sufficient amount of exposure to the image sensor by increasing the exposure time of a shutter when brightness decreases. However, when the exposure time of the shutter is simply increased to ensure appropriate exposure amount in a low luminance environment such as at night, hand shake is caused and thus an image is shaken accordingly, thereby blurring the image. Also, when using an electronic flash, a near subject is photographed too bright, and a far subject is photographed too dark. Thus it is difficult to obtain natural looking images.

Accordingly, in the conventional art, a degradation of image quality is prevented by controlling the exposure time of a shutter according to the brightness to be shorter than usual (i.e., increasing the shutter speed as compared to the usual case) using an electronic method. However, when the exposure time is shortened, the exposure is shortened, and thus the image is darkened.

SUMMARY

According to an aspect of an exemplary embodiment, there is provided a method of controlling exposure when capturing an image under low brightness conditions, wherein when an automatic exposure time value, which is calculated using a method of automatically controlling exposure, in which an exposure time value is automatically determined to be substantially in inverse proportion to the brightness of a subject, is smaller than a first exposure time value, a control exposure time value is set as the automatic exposure time value, and wherein when the automatic exposure time value, which is calculated using the method of automatically controlling exposure, is greater than or equal to the first exposure time value and smaller than or equal to a second exposure time value, the control exposure time value is set as the first exposure time value, and wherein when the automatic exposure time value, which is calculated using the method of automatically controlling exposure, is greater than the second exposure time value, the control exposure time value is determined to be substantially in proportion to the automatic exposure time value such that the control exposure time value is smaller than the automatic exposure time value by predetermined steps, and wherein sensitivity is controlled to increase according to a difference between the automatic exposure time value and the control exposure time value.

The first exposure time value may be an exposure limit time value at which hand shake blur is substantially generated in an apparatus for capturing images. The first exposure time value may change according to the focal distance of a lens of the digital image capturing apparatus.

As such, since the control exposure time value is set to be smaller than the automatic exposure time value under low brightness conditions, an image with reduced hand shake blur can be obtained. At the same time, by appropriately controlling the ISO sensitivity utilizing, e.g., a sensitivity value, and compensating for a short exposure amount required for the predetermined exposure amount needed for image capturing, darkening of the image can also be prevented.

The second exposure time value may be determined according to a maximum sensitivity that is capable of compensating for the short amount of exposure that corresponds to a maximum difference between the automatic exposure time value and the control exposure time value. The greater the ISO sensitivity provided by the digital image capturing apparatus, the shorter the controlling exposure time value, and accordingly, the function of compensating the hand shake blue of an image under low brightness conditions can be improved.

According to another aspect of an exemplary embodiment, there is provided a method of capturing an image, the method comprising capturing an image using parameters for controlling exposure that are obtained according to the above-described method of automatically controlling exposure. The method may further comprise reducing noise of the captured image. Accordingly, noise of the image, which is captured under low brightness conditions and for which hand shake blur is compensated, can be reduced.

According to another aspect of an exemplary embodiment, there is provided a method of capturing a digital image, the method comprising: capturing a first image using parameters obtained by a method of automatically controlling exposure, in which an exposure time value is automatically determined substantially in inverse proportion to the brightness of a subject; capturing a second image using the parameters obtained by the above-described method of automatically controlling exposure; and synthesizing the first and second images such that an image from which noise and hand shake blur are removed is formed.

As such, by synthesizing a first image which is a source image with little noise and a second image which includes no hand shake blur, a synthesized image with reduced noise and hand shake blur can be obtained.

The method may further comprise reducing noise of the image. When the blurring of the first image is strong, the noise of the second image, whose hand shake blur is reduced but which includes much noise, may be reduced.

According to another aspect of an exemplary embodiment, there is provided a computer readable recording medium having stored thereon a computer program for executing the above-described image capturing method using parameters for controlling exposure that are obtained according to the above-described method of automatically controlling exposure. Also, according to another aspect of an exemplary embodiment, there is provided a computer readable recording medium having stored thereon a computer program for executing the above-described image capturing method comprising capturing a first image and a second image and synthesizing the first and second images. Also, according to another aspect of the present invention, there is provided a computer readable recording medium having embodied thereon a computer program for executing the above-described image capturing method further comprising reducing noise of the image.

According to another aspect of an exemplary embodiment, there is provided an apparatus for capturing images, the apparatus comprising an exposure control unit controlling parameters for controlling exposure and required for capturing an image, wherein in low brightness conditions, the exposure control unit controls the parameters such that: when an automatic exposure time value, which is calculated using a method of automatically controlling exposure, in which an exposure time value is automatically determined to be substantially in inverse proportion to the brightness of a subject, is smaller than a first exposure time value, a control exposure time value is set as the automatic exposure time value, and wherein when the automatic exposure time value that is calculated using the method of automatically controlling exposure is greater than or equal to the first exposure time value and smaller than or equal to a second exposure time value, the control exposure time value is set as the first exposure time value, and wherein when the automatic exposure time value that is calculated using the method of automatically controlling exposure is greater than the second exposure time value, the control exposure time value is determined to be substantially in proportion to the automatic exposure time value such that the control exposure time value is smaller than the automatic exposure time value by predetermined steps, and wherein sensitivity is controlled to be increased according to a difference between the automatic exposure time value and the control exposure time value.

The apparatus may further comprise a noise attenuating unit that reduces noise of the image.

The apparatus may further comprise an image synthesizing unit that synthesizes a plurality of images, wherein the exposure control unit determines parameters for capturing a second image using a method of automatically controlling exposure, in which an exposure time value is automatically determined substantially in inverse proportion to the brightness of a subject, and the image synthesizing unit synthesizes the first and second images to form an image from which noise and hand shake blur are removed. Also, the apparatus may further comprise a noise attenuating unit that reduces noise of the image.

BRIEF DESCRIPTION OF THE DRAWINGS

The above and other features and advantages of the exemplary embodiments will become more apparent by describing in detail with reference to the attached drawings in which.

DETAILED DESCRIPTION

The present invention will now be described more fully with reference to the accompanying drawings, in which exemplary embodiments are shown.

Figure 1:
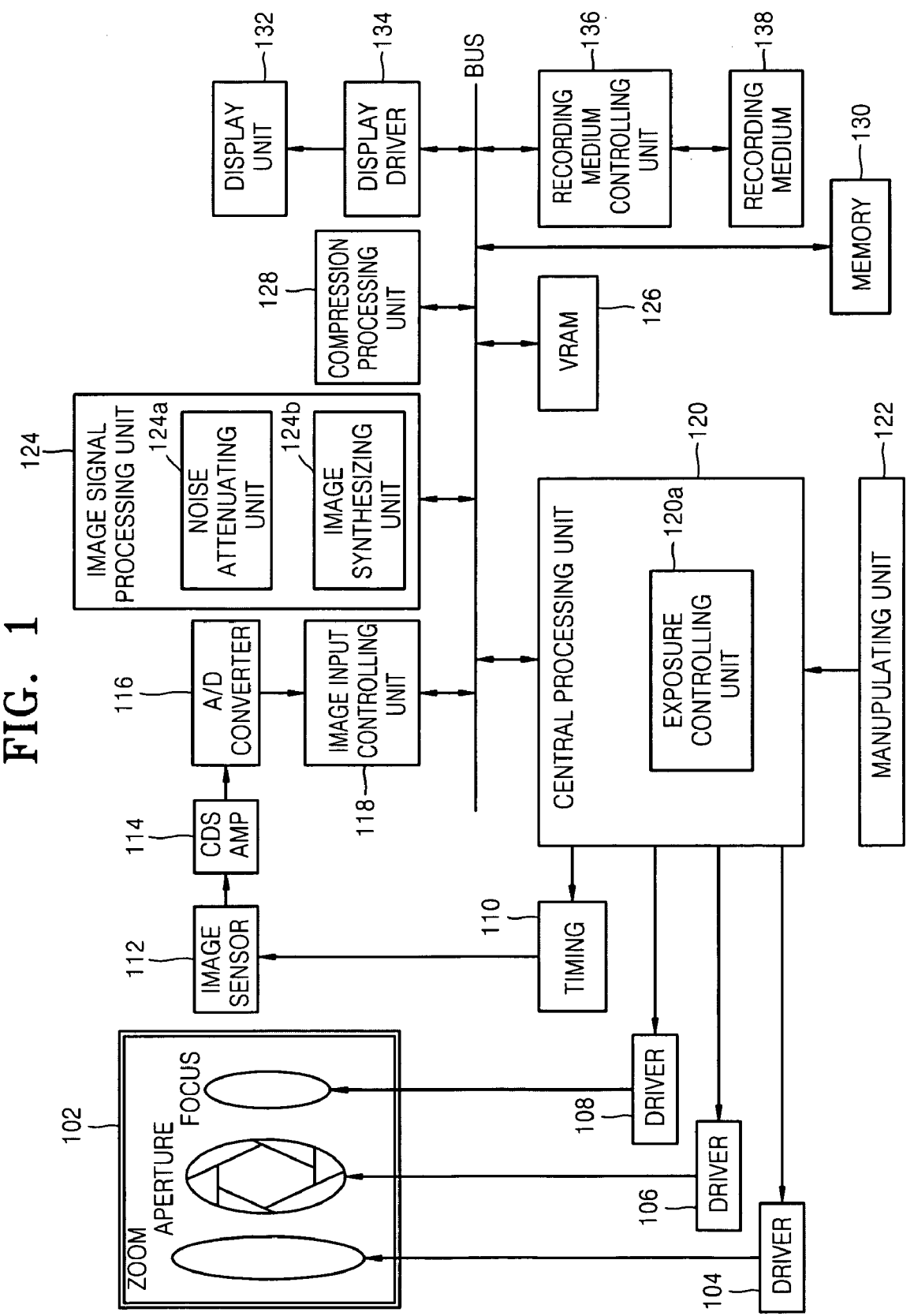
FIG. 1 is a block diagram of an apparatus for capturing images, according to an embodiment of the present invention.

FIG. 1 is a block diagram illustrating an apparatus for capturing images, according to an exemplary embodiment. The apparatus for capturing images includes an optical system 102, drivers 104, 106, and 108, a timing controlling unit 110, an image sensor 112, a correlated double sampling (CDS)/amplifier (AMP) 114, an A/D converter 116, an image input controlling unit 118, a central processing unit 120, a manipulating unit 122, an image signal processing unit 124, a video random processing memory (VRAM) 126, a compression processing unit 128, a memory 130, a display unit 132, a display driver 134, a recording medium controlling unit 136, and a recording medium 138.

The optical system 102 forms an image, corresponding to a subject viewed through a lens, in the image sensor 112. The driver 104 drives a zoom device of the optical system 102. The driver drives an aperture device of the optical system 102. The driver 108 drives a focus device of the optical system 102. The timing controlling unit 110 controls the exposure time using each of the pixels constituting the image sensor 112 or controls charge reading. The image sensor 112 may be an image sensor, such as a charge coupled diode (CCD) sensor or a complementary metal-oxide semiconductor (CMOS) sensor, that photoelectrically converts light into electric signals, and generates electric signals according to light an image sensor has received. The CDS/AMP 114 removes low frequency noise in the electrical signals obtained from the image sensor 112 and also amplifies the electrical signals to a certain level. The A/D converter 116 converts an analog electrical signal into a digital signal. The image input control unit 118 receives an operation command from the central processing unit 120 to control the operations of the image sensor 112, the CDS/AMP 114, and the A/D converter 116 which are related to the input of images. The manipulating unit 122 is formed of a power switch, a mode converting unit, and a shutter button, and so forth, and may be used by the user to set the shutter speed and ISO sensitivity, etc. In addition, the image signal processing unit 124 calculates an automatic exposure time value that is set by an automatic exposure (AE) and an evaluation value of a focus distance that is set by an auto-focus (AF).

The VRAM 126 is a memory for displaying images, formed of a memory having a plurality of channels so that recording of a display image and displaying of the display image to the display unit 132 can be performed at the same time. The compression processing unit 128 compresses input image data in a JPEG point photographic experts group) compression format or in an LZW (Lempel-Ziv-Welch) compression format, etc. The memory 130 may be formed of a semiconductor memory device such as a synchronous DRAM and stores images. Also, the image signal processing unit 124 may include an image synthesizing unit 124b and a noise attenuating unit 124*a*. The images synthesized by the image signal processing unit 124 may be recorded in the memory 130, or operation programs of the central processing unit 120 may be stored to the memory 130. The image synthesizing unit 124*b* synthesizes a plurality of images. The noise attenuating unit 124*a* reduces noise contained in the captured image or synthesized image. The function of the noise attenuating unit 124*a* can be realized, as illustrated in FIG. 1, by the image signal processing unit 124 or by the user using a software to reduce noise in the captured image.

The display unit 132 is formed of a display device such as an LCD, and displays an image read out from the VRAM 126. The display driver 134 drives the display unit 132 and controls the output of the display unit 132. The recording medium controlling unit 136 controls recording of image data to the recording medium 138 or reading of the image data or setup information recorded to the recording medium 138. The recording medium 138 is formed of an optical memory, optical magnetic disk, a magnetic disk, or a semiconductor memory device, and is capable of recording captured image data. Also, the recording medium 138 may be formed attachably/detachably to/from a corresponding photographing apparatus.

The central processing unit 120 may include an exposure controlling unit 120*a*. That is, the function of the exposure controlling unit 120*a* may be realized by the central processing unit 120 that may be a digital signal processor (DSP). The exposure controlling unit 120*a* may be formed of a separate hardware block. Also, although not shown in FIG. 1, the exposure controlling unit 120*a* may be included in the image signal processing unit 124. The exposure controlling unit 120*a* determines an appropriate shutter speed (exposure time value) at which appropriate exposure is obtained based on the brightness of a subject. In this manner, the automatic exposure control is performed.

Figure 2:
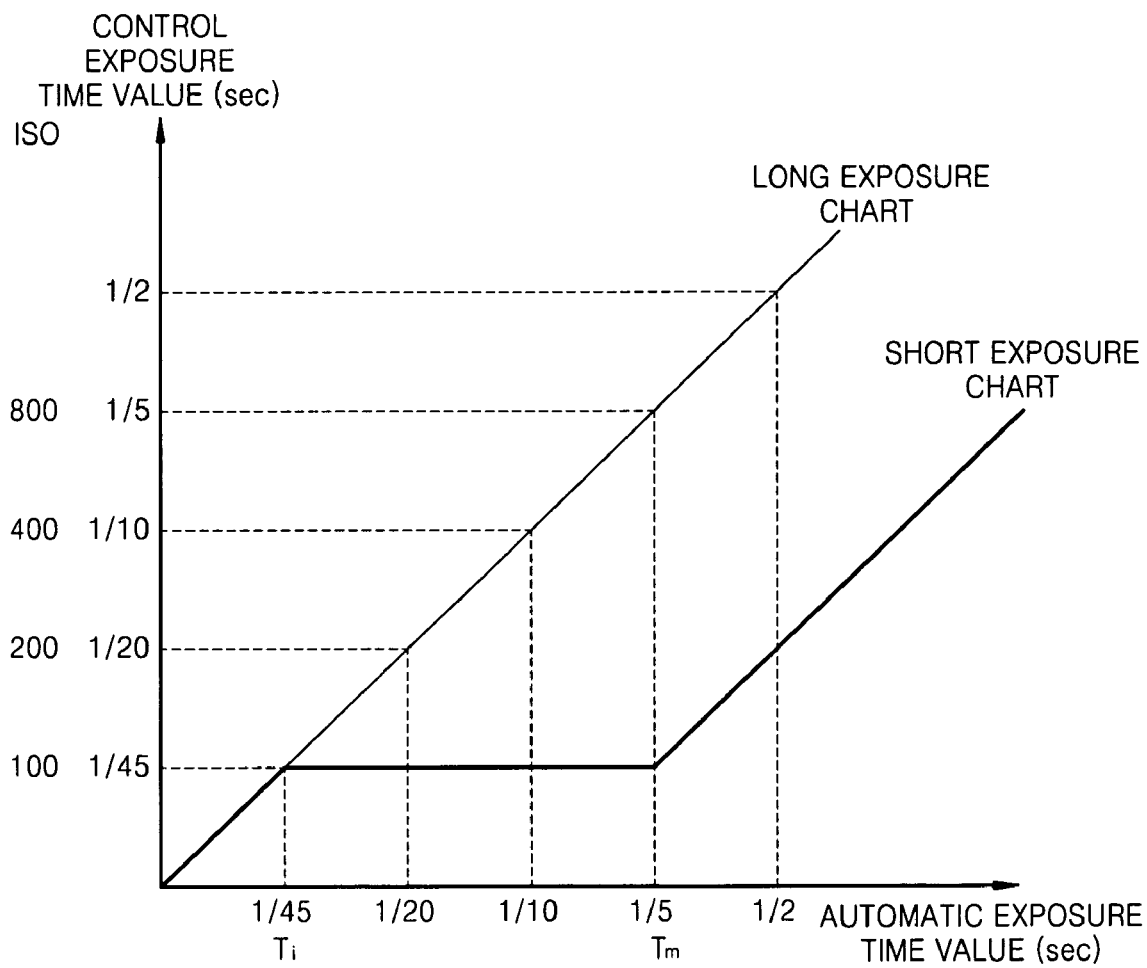
FIG. 2 is a graph showing control exposure time values and sensitivities with respect to automatic exposure time values in a method of automatically controlling exposure according to an exemplary embodiment.

FIG. 2 is a graph showing exposure controlling time values and sensitivities with respect to automatic exposure time values in a method of automatically controlling exposure according to an exemplary embodiment.

Under low brightness conditions, the exposure controlling unit 120*a* can perform both a long exposure and a short exposure in a long exposure mode and a short exposure mode, respectively. Alternatively, the exposure controlling unit 120*a* may perform only a short exposure. The long exposure controlling is shown in a long exposure chart, and the short exposure controlling is shown in a short exposure chart. A method of automatically controlling exposure according to an exemplary embodiment refers to, as shown in the long exposure chart, a controlling method in which control exposure time values are determined such that the control exposure time values are reduced substantially in proportion to the brightness of a subject. In addition, the control exposure time values that are determined according to the automatic controlling of exposure are referred to as automatic exposure time values. The automatic exposure time values according to a certain brightness of the subject may be variably set according to the apparatus for capturing images, but the automatic exposure time values may also be controlled substantially in inverse proportion to the brightness of the subject.

As shown by the long exposure chart in FIG. 2, when the automatic exposure time value is, for example, $1/45$ sec, the control exposure time value is $1/45$ sec, and when the automatic exposure time value is $1/20$ sec, the control exposure time value is $1/20$ sec, and when the automatic exposure time value is $1/10$ sec, the control exposure time value is $1/10$ sec, and when the automatic exposure time value is $1/5$ sec, the control exposure time value is $1/5$ sec. Here, ISO sensitivity is fixed to a predetermined degree, for example, ISO 100. As described above, as shown by the long exposure chart in the method of automatically controlling exposure, when the automatic exposure time value is long because of the low brightness of the subject while the ISO sensitivity is fixed, the exposure controlling unit 120*a* also sets the control exposure time value long. On the contrary, if the automatic exposure time value is short because of the relatively high brightness of the subject while the ISO sensitivity is fixed, the exposure controlling unit 120*a* also sets the control exposure time value short. Accordingly, a certain amount of exposure required for image capturing can be provided.

As shown by the short exposure chart in FIG. 2, when an automatic exposure time value is smaller than a first exposure time value Ti, which is a hand shake correction limit exposure time value (e.g., $1/45$ sec), a control exposure time value is set as the automatic exposure time value. In this case, since the control exposure time value is smaller than the hand shake correction limit exposure time value, a clear image without hand shake blur can be obtained. In this range, the ISO sensitivity is predetermined, for example, ISO 100.

When the automatic exposure time value is greater than or equal to the first exposure time value Ti and smaller than a second exposure time value Tm (e.g., $1/5$ sec), the control exposure time value is fixed to the first exposure time value Ti. Thus, since the control exposure time value is set not to be greater than a hand shake correction limit exposure time value under low brightness conditions, a clear image without hand shake blur can be obtained. For example, when the automatic exposure time value is between $1/45$ sec and $1/5$ sec, the control exposure time value is set to $1/45$ sec. However, in order to compensate for the short amount of exposure that is required to provide a certain amount of exposure which is needed for image capturing, ISO sensitivity is increased by an exposure time value difference between the automatic exposure time value and the control exposure time value, according to an exemplary embodiment. For example, in the graph of FIG. 2, when the automatic exposure time value is $1/20$ sec, the control exposure time value is $1/45$ sec, thus a difference between the automatic exposure time value and the control exposure time value is one step (1 Tv). That is, the amount of short exposure caused by the difference between the automatic exposure time value and the control exposure time value is 1 Ev, and ISO sensitivity needs to be increased by one step (1 Sv) to compensate for the amount of short exposure. Accordingly, a sensitivity corresponding to the control exposure time value of $1/20$ is controlled to be ISO 200, which is the predetermined ISO 100 increased by one step (ISO 100→200). Similarly, in FIG. 2, when the automatic exposure time value is $1/10$ sec, the control exposure time value is $1/45$ sec, and the ISO sensitivity will be controlled to be ISO 400, which is the predetermined ISO 100 increased by two steps (ISO 100→200→400). Also, when the automatic exposure time value is $1/5$ sec, the control exposure time value is $1/45$ sec, and the ISO sensitivity will be controlled to be ISO 800, which is the predetermined ISO 100 increased by three steps (ISO 100→200→400→800). Accordingly, according to the method of automatically controlling exposure of the present invention, a clear image having appropriate brightness without hand shake blur can be captured.

When the automatic exposure time value is greater than the second exposure time value Tm, the control exposure time value is set in proportion to the automatic exposure time value based on that the control exposure time value is set smaller than a long exposure time value corresponding to the automatic exposure time value, by certain steps, for example, by 3 Tv. For example, when the automatic exposure time value is ½ sec in the graph of FIG. 2, the long exposure time value is ½ sec, and the control exposure time value is smaller than the long exposure time value by three steps, and thus the control exposure time value is finally set to 1/20 sec.

As described above, as the control exposure time value in a short exposure mode under low brightness conditions is set smaller than the control exposure time value in a long exposure mode by 3 Tv, a relatively clear image without hand shake blur can be obtained. However, in order to compensate for the short amount of exposure required for a predetermined exposure amount that is needed for image capturing, ISO sensitivity is increased by the difference nSv between the ISO sensitivities corresponding to the automatic exposure time value and the control exposure time value. For example, when the automatic exposure time value, as shown in FIG. 2, is ½ sec, the control exposure time value is 1/20 sec, and thus the difference between the automatic exposure time value and the control exposure time value is three steps (3 Tv). That is, the short amount of exposure due to this is 3 Ev, and in order to compensate for this, ISO sensitivity needs to be increased from the predetermined ISO 100 by three steps (3 Sv). Accordingly, the ISO sensitivity corresponding to ½ of the control exposure time value is controlled to be ISO 800, which is the preset ISO 100 increased by three steps. (ISO 100→200→400→800) Accordingly, according to the method of automatically controlling exposure according to an exemplary embodiment, a clear image having proper brightness and reduced hand shake blur can be captured.

Here, the first exposure time value Ti is a control exposure time value that corresponds to the fast shutter speed which is sufficient to prevent hand shake, that is, a hand shake correction limit exposure time value. The first exposure time value Ti may vary according to the type of the images capturing apparatus; here, it is 1/45 sec. Also, the first exposure time value Ti may vary according to the ISO sensitivity of the image sensor of the images capturing apparatus or the noise sensitivity of raw images. Moreover, the first exposure time value Ti may vary according to the focal distance of the lens of the images capturing apparatus.

The second exposure time value Tm is a time value to fix a control exposure time value to the first exposure time value Ti regardless of the automatic exposure time value, when the automatic exposure time value is in a range between the first exposure time value Ti and the second exposure time value Tm. In other words, the second exposure time value Tm is determined according to the maximum ISO sensitivity that is capable of compensating for the short amount of exposure that corresponds to a maximum exposure time value difference between the automatic exposure time value and the control exposure time value. Accordingly, the second exposure time value Tm may vary according to the maximum ISO sensitivity that the apparatus for capturing images provides and the hand shake limit correction exposure time value. In an exemplary embodiment, the apparatus for capturing images provides ISO 800 as a maximum ISO sensitivity; when the predetermined ISO sensitivity is assumed ISO 100, the predetermined ISO sensitivity can be increased by three steps. Accordingly, when the hand shake correction limit exposure time value is 1/45 sec, the second control exposure time value is ⅕ sec, which is 1/45 sec increased by three steps (3 Tv). Meanwhile, the greater the maximum ISO sensitivity that the apparatus for capturing images provides, the shorter the exposure time value can be, and thus the hand shake correction function under low brightness conditions can be improved.

Figure 3:
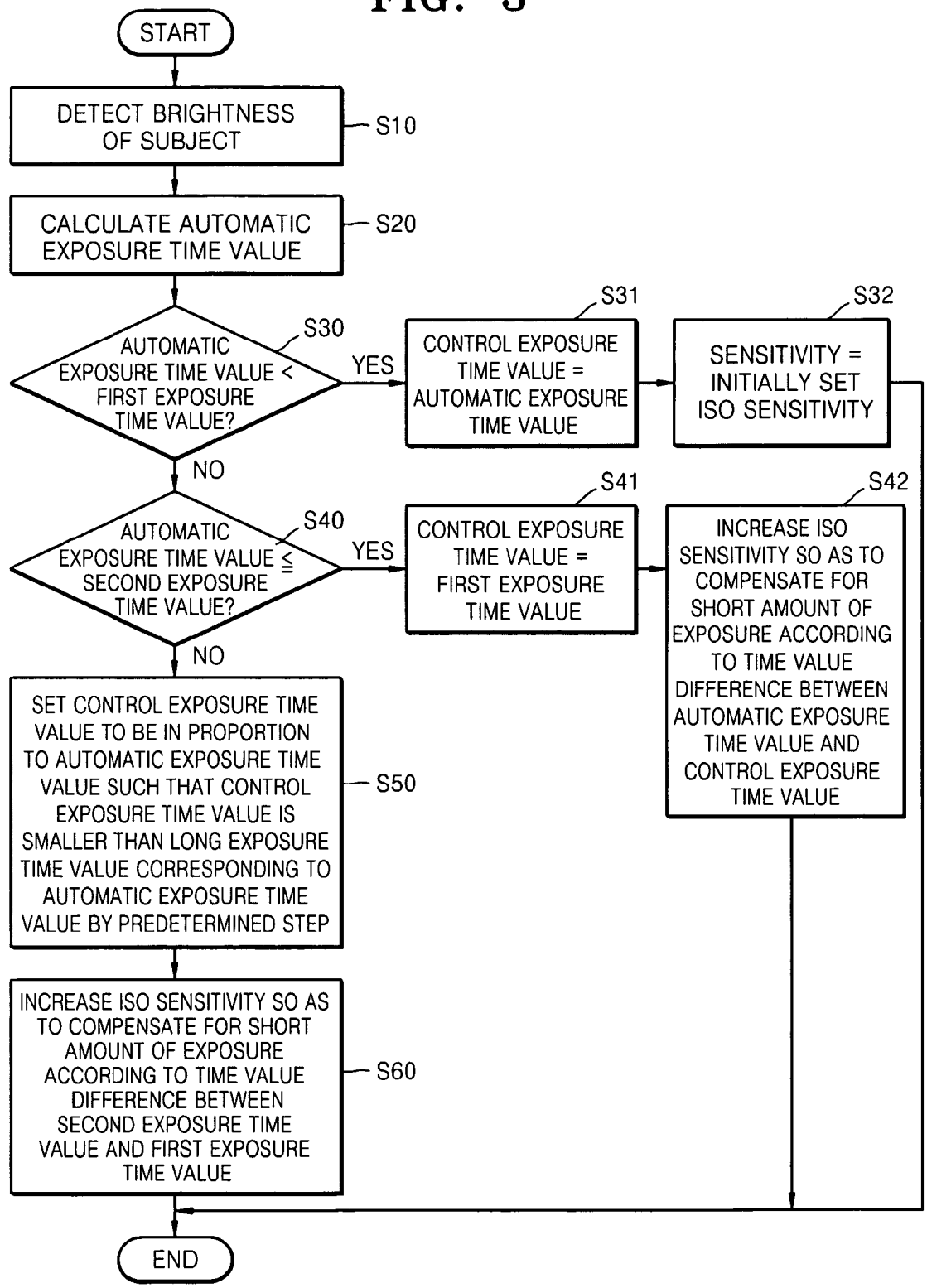
FIG. 3 is a flowchart illustrating the method of automatically controlling exposure, as illustrated in FIG. 2.

FIG. 3 is a flowchart illustrating the method of automatically controlling exposure, as illustrated in FIG. 2. The image signal processing unit 124 detects the brightness Bv of a subject by analyzing a signal obtained from a photometric sensor, in operation S10. The exposure controlling unit 120a can calculate an automatic exposure time value by substituting the predetermined ISO sensitivity that is predetermined in the apparatus for capturing images and the brightness Bv of the subject, which is predetermined in the images capturing apparatus, based on Equation 1 which shows an additive system of photographic exposure (APEX), in operation S20. The APEX, as defined in Equation 1, is used to simplify the calculation of exposure values.

$$Ev=Av+Tv=Bv+Sv,$$ [Equation 1]

where Ev is an exposure value, Av is an aperture value, Tv is an exposure time value, Bv is a brightness value, and Sv is ISO sensitivity (speed value). In APEX, it is easy to control the amount of exposure because the variation of 1 Ev corresponds to the variation of an exposure value by one step. For example, when the exposure value Ev is increased by one step, the exposure value Ev is doubled, and when the exposure value Ev is decreased by one step, the exposure value Ev is reduced by half. Also, a variation of 1 Tv corresponds to the variation of the exposure time value Tv by one step, and thus when the exposure time value Tv is increased by one step, the exposure time value Tv doubles. However, the exposure time value Tv does not need to be doubled by a one step increase. The exposure time value Tv, for example, the exposure time value Tv according to a one step increase may be set to 1/45 sec, 1/20 sec, 1/10 sec, ⅕ sec, and ½ sec. This may also be applied to other parameters for controlling exposure, for example, parameters like exposure values Ev, aperture values Av, ISO sensitivities Sv, and so forth.

The exposure controlling unit 120a determines whether the calculated automatic exposure time value is smaller than the first exposure time value Ti, in operation S30. If the calculated automatic exposure time value is determined to be smaller than the first exposure time value Ti, the control exposure time value is set as the automatic exposure time value, in operation S31. The ISO sensitivity is maintained as the ISO sensitivity that is predetermined at the beginning, for example, ISO 100, in operation S32.

Otherwise, if the calculated automatic exposure time value is determined to be greater than or equal to the first exposure time value Ti and smaller than or equal to the second exposure time value Tm, the control exposure time value is set to be the first exposure time value Ti, in operation S41. In order to compensate for the short amount of exposure, the ISO sensitivity is increased by a difference between the automatic exposure time value and the control exposure time value, in operation S42.

When the automatic exposure time value is determined to be greater than the second exposure time value Tm, the control exposure time value is set in proportion to the automatic exposure time value such that the control exposure time value is smaller than a long exposure time value which corresponds to the automatic exposure time value by certain steps, for example, three steps, in operation S50.

In addition, the exposure controlling unit 120a increases the sensitivity by an exposure time value difference between the automatic exposure time value and the control exposure time value in order to compensate for the automatic exposure time value that is required for a predetermined exposure amount that is needed for image capturing, in operation S60.

As described above, according to the method of automatically controlling exposure according to an exemplary embodiment, the short amount of exposure can be compensated for in a dark environment like at night by increasing the shutter speed and increasing the ISO sensitivity at the same time, and thus a clear image with proper brightness and reduced hand shake blur can be captured.

Figure 4:
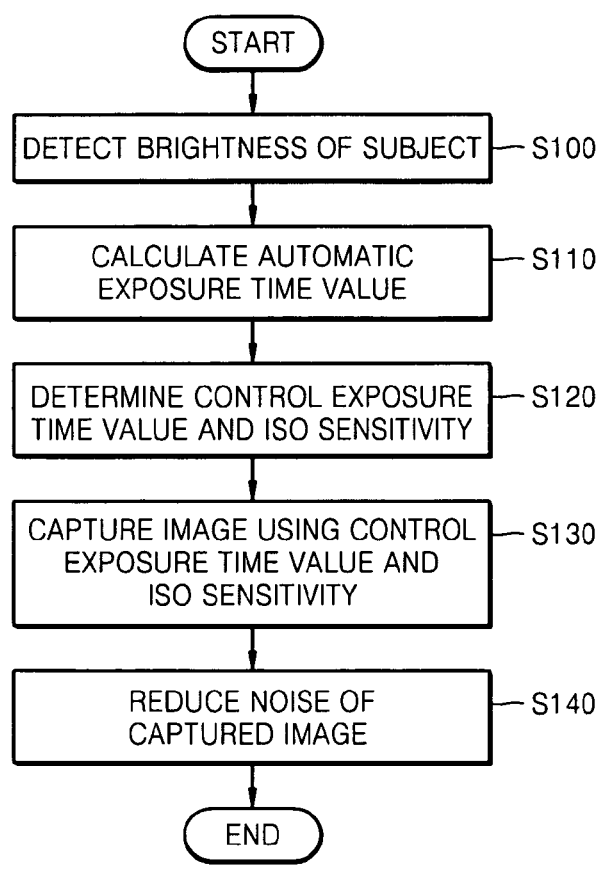
FIG. 4 is a flowchart illustrating a method of capturing images, according to an exemplary embodiment.

FIG. 4 is a flowchart illustrating a method of capturing images, according to an exemplary embodiment.

The image signal processing unit 124 analyzes signals obtained from a photometric sensor and thus determines the brightness Bv of the subject, in operation S100. The image signal processing unit 124 calculates the automatic exposure time value by substituting the ISO sensitivity, which is predetermined in the apparatus for capturing images, and the brightness Bv of the subject, which is also measured in the apparatus for capturing images, with Equation 1, in operation S110.

As described above, the exposure controlling unit 120a determines the control exposure time value and the ISO sensitivity using the method of automatically controlling exposure according to an exemplary embodiment, in operation S120. Then, an image is captured using parameters for controlling exposure, including the control exposure time values, in operation S130. The obtained control exposure time value has a shorter exposure time than that of the long exposure mode, and thus a relatively clear image without hand shake blur can be obtained in low brightness conditions as well. However, since the capturing operation is performed with increased ISO sensitivity to compensate for the short exposure amount, quite a lot of noise might be included in the captured image. Accordingly, here, it is preferable to use the noise attenuating unit 124a to pass an image signal therethrough, and thus decrease noise, in operation S140. Accordingly, a clear image with reduced hand shake blur and noise can be obtained. As described above, the function of noise attenuation may be performed in the apparatus for capturing images, or by using additional software.

Figure 5:
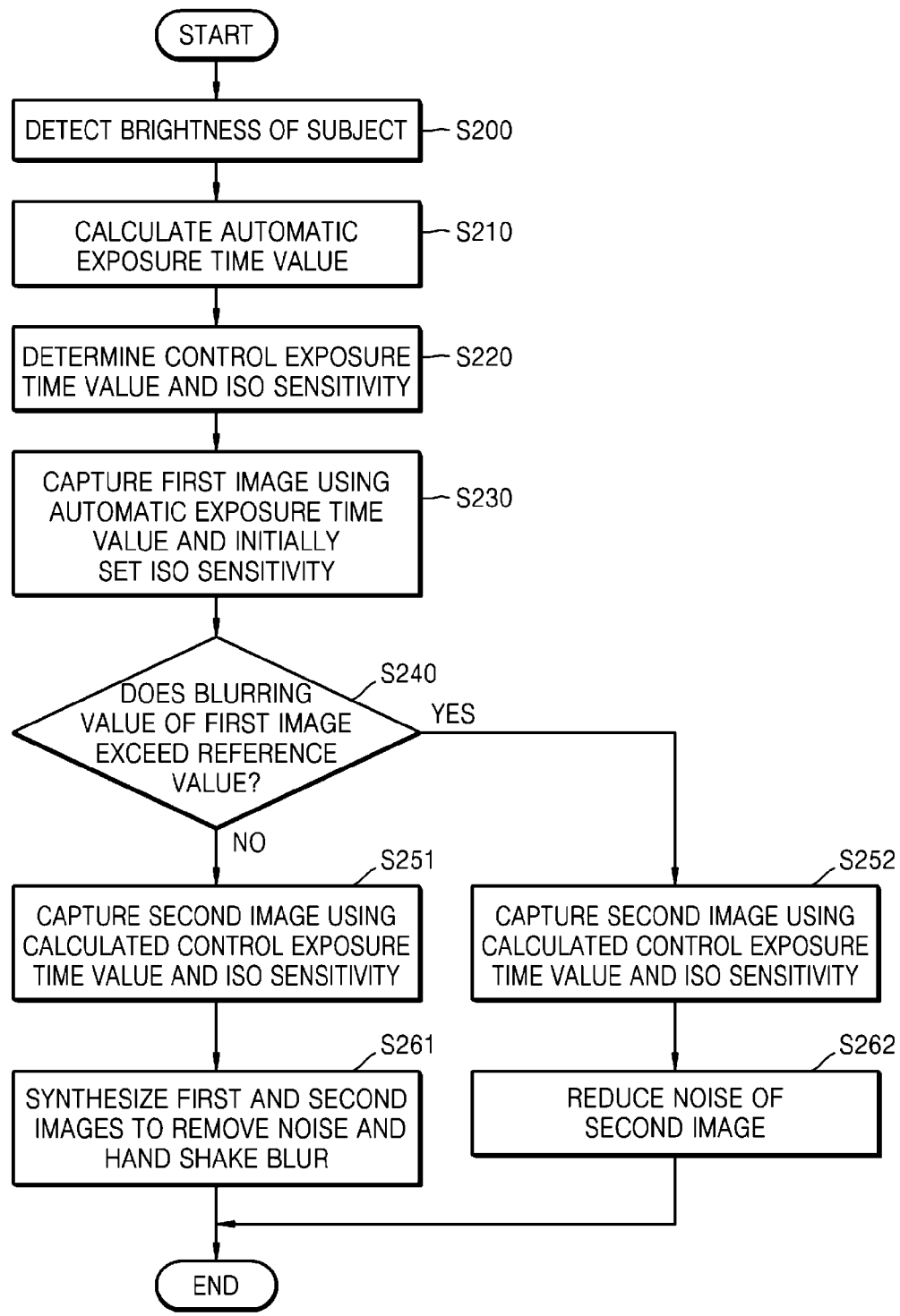
FIG. 5 is a flowchart illustrating a method of capturing images, according to another exemplary embodiment.

FIG. 5 is a flowchart illustrating a method of capturing images, according to another exemplary embodiment.

The image signal processing unit 124 analyzes signals obtained from a photometric sensor, and so forth, to determine a brightness Bv of a subject, in operation S200. The signal processing unit 124 calculates an automatic exposure time value by substituting ISO sensitivity, which is predetermined in apparatus for capturing images, and the brightness Bv of a subject, which is measured in the apparatus for capturing images, based on Equation 1, to calculate an automatic exposure time value, in operation S210. As described above, control exposure time values and ISO sensitivities are determined using the method of automatically controlling exposure according to an exemplary embodiment, in operation S220.

Then, a first image is captured using the automatic exposure time value and ISO sensitivity, for example, ISO 100, that is initially set, in operation S230. It is determined whether shaking of the first image is excessive such that a blurring value of the first image exceeds a reference value, in operation S240.

If the blurring value of the first image is smaller than the reference value, a second image is captured using parameters for controlling exposure, such as the calculated control exposure time value and ISO sensitivity, in operation S251. Then the first and second images are synthesized to form an image from which noise and hand shake blur are removed, in operation S261. The shutter speed and the ISO sensitivity of the first image is controlled according to the appropriately calculated automatic exposure time value according to the brightness of the subject. Accordingly, the first image has good color quality and little noise. Accordingly, the first image can be used as a source image. By synthesizing this source image with little noise and the second image which has no hand shake, a synthesized image from which noise and hand shake blur are removed can be obtained. Thus, a clear image with reduced hand shake blur and noise can also be obtained in low brightness conditions.

Otherwise, if the blurring value of the first image is greater than a reference value, the first image may preferably not be used as a source image. Instead, by using parameters for controlling exposure such as the calculated control exposure time value and ISO sensitivity, a second image is captured, in operation S252. The control exposure time value that is used to capture the second image has a shorter exposure time than that of a long exposure mode, and thus a relatively clear image without hand shake blur can be obtained in low brightness conditions; however, since capturing is performed with increased ISO sensitivity to compensate for the short amount of exposure, quite a lot of noise may be contained in the captured image. Consequently, the noise attenuating unit 124a may preferably be used. As the image signal is passed through the noise attenuating unit 124a, noise is reduced, in operation S262, and thus a clear image with reduced hand shake blur and noise is obtained accordingly. The function of noise attenuation may be performed in the apparatus for capturing images as described above, or by using additional software.

Meanwhile, although not illustrated in the drawing, after operation S261, an operation of additionally reducing noise in the synthesized image may be further included.

While the exemplary embodiments have been particularly shown and described, it will be understood by one of ordinary skill in the art that various changes in form and details may be made therein without departing from the spirit and scope of the present invention as defined by the following claims.

What is claimed is:

1. A method of controlling exposure when capturing an image under low brightness conditions, comprising:
    calculating an automatic exposure time value such that an exposure time value is substantially in inverse proportion to the brightness of a subject;
    when the automatic exposure time value is smaller than a first exposure time value, setting a control exposure time value as the automatic exposure time value;
    when the automatic exposure time value is greater than or equal to the first exposure time value and smaller than or equal to a second exposure time value, setting the control exposure time value as the first exposure time value;
    when the automatic exposure time value is greater than the second exposure time value, setting the control exposure time value to be substantially in proportion to the automatic exposure time value such that the control exposure time value is smaller than the automatic exposure time value by predetermined steps; and
    increasing a sensitivity value according to a difference between the automatic exposure time value and the control exposure time value.

2. The method of claim 1, wherein the first exposure time value is an exposure limit time value at which hand shake blur is substantially generated in an apparatus for capturing images.

3. The method of claim 2, wherein the first exposure time value changes according to the sensitivity of an image sensor of the apparatus for capturing images or to noise sensitivity of a raw image.

4. The method of claim 1, wherein the second exposure time value is determined according to a maximum sensitivity that is capable of compensating for a short amount of exposure that corresponds to a maximum difference between the automatic exposure time value and the control exposure time value.

5. The method of claim 1, further comprising:
capturing an image using the control exposure time value and the sensitivity value.

6. The method of claim 5, further comprising reducing noise of the captured image.

7. The method of claim 1, further comprising:
capturing a first image using the automatic exposure time value;
capturing a second image using the control exposure time value and the sensitivity value; and
synthesizing the first and second images such that an image from which noise and hand shake blur are removed is formed.

8. The method of claim 7, further comprising reducing noise of the image.

9. A non-transitory computer readable recording medium storing a computer program that provides instructions for:
calculating an automatic exposure time value such that an exposure time value is substantially in inverse proportion to the brightness of a subject;
when the automatic exposure time value is smaller than a first exposure time value, setting a control exposure time value as the automatic exposure time value;
when the automatic exposure time value is greater than or equal to the first exposure time value and smaller than or equal to a second exposure time value, setting the control exposure time value as the first exposure time value;
when the automatic exposure time value is greater than the second exposure time value, setting the control exposure time value to be substantially in proportion to the automatic exposure time value such that the control exposure time value is smaller than the automatic exposure time value by predetermined steps;
increasing a sensitivity value according to a difference between the automatic exposure time value and the control exposure time value.

10. The non-transitory computer readable recording medium of claim 9, wherein the computer program further provides instructions for:
capturing an image using the automatic exposure time value and the control exposure time value and the sensitivity value; and
reducing noise of the captured image.

11. The non-transitory computer readable recording medium of claim 10, wherein the computer program further provides instructions for:
capturing a first image using the automatic exposure time value;
capturing a second image using the control exposure time value and the sensitivity value; and
synthesizing the first and second images such that an image from which noise and hand shake blur are removed is formed.

12. The non-transitory computer readable recording medium of claim 11, wherein the computer program further provides instructions for:
reducing noise of the image.

13. An apparatus for capturing an image, the apparatus comprising an exposure control unit for controlling parameters for controlling exposure, wherein in low brightness conditions, the exposure control unit:
calculates an automatic exposure time value such that an exposure time value is substantially in inverse proportion to the brightness of a subject;
when the automatic exposure time value is smaller than a first exposure time value, sets a control exposure time value as the automatic exposure time value;
when the automatic exposure time value is greater than or equal to the first exposure time value and smaller than or equal to a second exposure time value, sets the control exposure time value as the first exposure time value;
when the automatic exposure time value is greater than the second exposure time value, sets the control exposure time value to be substantially in proportion to the automatic exposure time value such that the control exposure time value is smaller than the automatic exposure time value by predetermined steps; and
increases a sensitivity value according to a difference between the automatic exposure time value and the control exposure time value.

14. The apparatus of claim 13, further comprising a noise attenuating unit for reducing noise of the image.

15. The apparatus of claim 13, further comprising an image synthesizing unit for synthesizing a plurality of images, wherein:
the exposure control unit captures a first image using the automatic exposure time value;
the exposure control unit captures a second image using the control exposure time value and the sensitivity value; and
the image synthesizing unit synthesizes the first and second images to form an image from which noise and hand shake blur are removed.

16. The apparatus of claim 15, further comprising a noise attenuating unit for reducing noise of the image.

* * * * *